US011667100B2

(12) United States Patent
Harris

(10) Patent No.: US 11,667,100 B2
(45) Date of Patent: Jun. 6, 2023

(54) CREASING DEVICES

(71) Applicant: Graham Michael Harris, Lutterworth (GB)

(72) Inventor: Graham Michael Harris, Lutterworth (GB)

(73) Assignee: TECH-NI-FOLD LIMITED, Lutterworth (GB)

( * ) Notice: Subject to any disclaimer, the term of this patent is extended or adjusted under 35 U.S.C. 154(b) by 461 days.

(21) Appl. No.: 15/465,085

(22) Filed: Mar. 21, 2017

(65) Prior Publication Data

US 2017/0190136 A1 Jul. 6, 2017

Related U.S. Application Data

(63) Continuation of application No. PCT/GB2015/052747, filed on Sep. 23, 2015.

(30) Foreign Application Priority Data

Sep. 23, 2014 (GB) ..................................... 1416770

(51) Int. Cl.
*B31F 1/10* (2006.01)
*B31F 1/00* (2006.01)
(Continued)

(52) U.S. Cl.
CPC .............. *B31F 1/10* (2013.01); *B31F 1/0003* (2013.01); *B31F 1/0006* (2013.01); *B31F 1/07* (2013.01);
(Continued)

(58) Field of Classification Search
CPC ........ B31F 1/10; B31F 1/0003; B31F 1/0006; B31F 1/07; B31F 1/0077; B31F 5/022;
(Continued)

(56) References Cited

U.S. PATENT DOCUMENTS 1,482,569 A * 2/1924 Lange ..................... B31B 50/00
229/930
1,577,620 A * 3/1926 Gammeter ............. B29D 30/46
83/342
(Continued)

FOREIGN PATENT DOCUMENTS

CN 203110414 U 8/2013
DE 273227 A1 6/1988
(Continued)

*Primary Examiner* — Sameh Tawfik
(74) *Attorney, Agent, or Firm* — Reinhart Boerner Van Deuren P.C.

(57) ABSTRACT

A creasing device is provided that includes a counter-rotating male drum and female drum. The male drum carries a conventional creasing ring with a central rib flanked by shoulders. The female drum comprises a central channel aligned with the creasing rib on the male drum; and a pair of projecting lateral ribs on each side of the central channel that are aligned with the shoulders on the male drum. The lateral ribs press a sheet of the card or paper stock against the shoulders of the creasing ring to better define the edges of the crease and to reduce the tendency of a printed coating on the stock to crack during subsequent folding. The pair of lateral ribs may be provided by a pair of inserts. Alternatively, both ribs and the central channel may be provided by a single insert.

15 Claims, 4 Drawing Sheets

(51) Int. Cl.

| | |
|---|---|
| ***B31F 1/07*** | (2006.01) |
| ***B42C 7/00*** | (2006.01) |
| *B31F 5/02* | (2006.01) |

(52) U.S. Cl.
CPC ............ *B42C 7/005* (2013.01); *B31F 1/0077* (2013.01); *B31F 5/022* (2013.01)

(58) Field of Classification Search
CPC .. B31B 50/56; B31D 2205/0052; B42C 7/005
USPC ........................... 493/160, 59, 228, 355, 403
See application file for complete search history.

(56) References Cited

U.S. PATENT DOCUMENTS

| | | | | | |
|---|---|---|---|---|---|
| 1,798,475 | A | * | 3/1931 | Lange | B31B 50/00 493/403 |
| 2,806,413 | A | | 9/1957 | Crooke | |
| 3,113,898 | A | * | 12/1963 | Tross | B26F 1/44 156/215 |
| 3,314,339 | A | * | 4/1967 | Guffy | B26D 3/085 493/403 |
| 3,526,566 | A | * | 9/1970 | Mcilvain, Jr. | B31F 1/0012 428/121 |
| 3,735,674 | A | * | 5/1973 | Haddock | B31B 50/00 493/354 |
| 3,919,924 | A | * | 11/1975 | Snodgrass | B31B 50/00 493/405 |
| 4,348,449 | A | * | 9/1982 | Seufert | B29C 53/06 229/930 |
| 4,417,883 | A | * | 11/1983 | Granger | B31F 1/10 493/241 |
| 5,393,295 | A | * | 2/1995 | Knecht | B31F 1/10 493/396 |
| 5,509,885 | A | * | 4/1996 | Brunlid | B31F 1/08 493/396 |
| 6,071,225 | A | * | 6/2000 | Kucharski | B31B 50/00 493/396 |
| 6,446,858 | B1 | * | 9/2002 | Louman | B65D 5/4266 229/5.82 |
| 6,572,519 | B1 | * | 6/2003 | Harris | B31F 1/10 493/395 |
| 7,556,284 | B2 | * | 7/2009 | Riha | B32B 43/003 280/728.3 |
| 7,670,275 | B2 | * | 3/2010 | Schaack | B31F 1/10 493/396 |

FOREIGN PATENT DOCUMENTS

| | | | |
|---|---|---|---|
| EP | 1937464 | A1 | 7/2008 |
| GB | 2475715 | A | 6/2011 |
| JP | 2008264625 | | 11/2008 |
| JP | 2014144848 | | 8/2014 |
| WO | WO 2007/023058 | A1 | 3/2007 |
| WO | WO 2007/023258 | | 3/2007 |
| WO | WO 2009/143981 | A1 | 12/2009 |

* cited by examiner

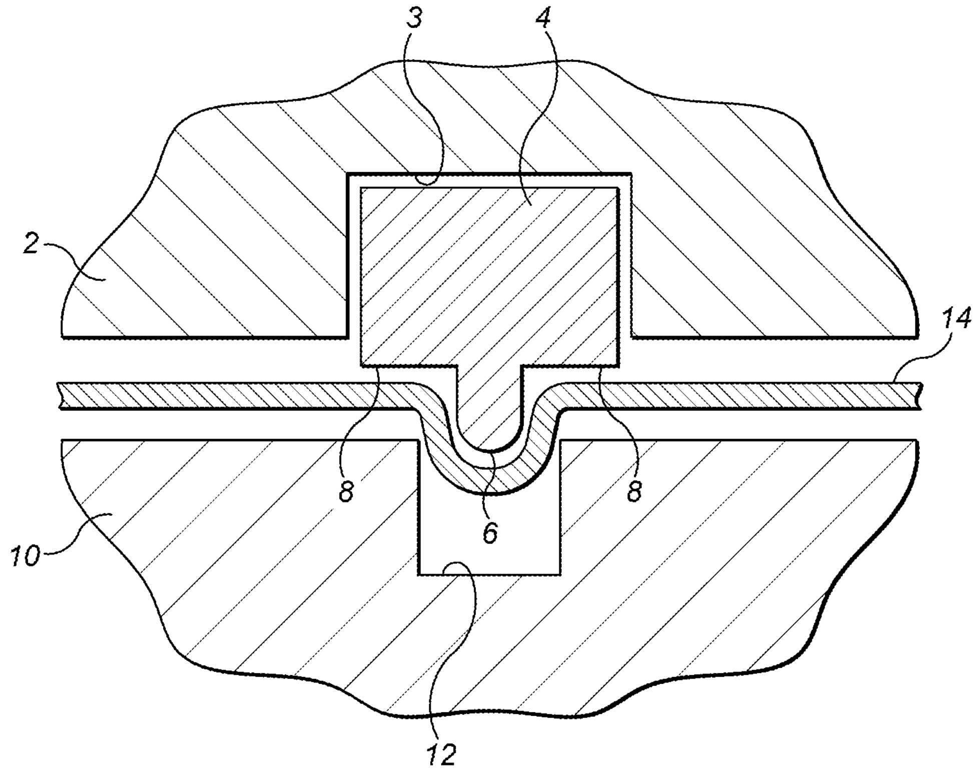
FIG. 1 - PRIOR ART
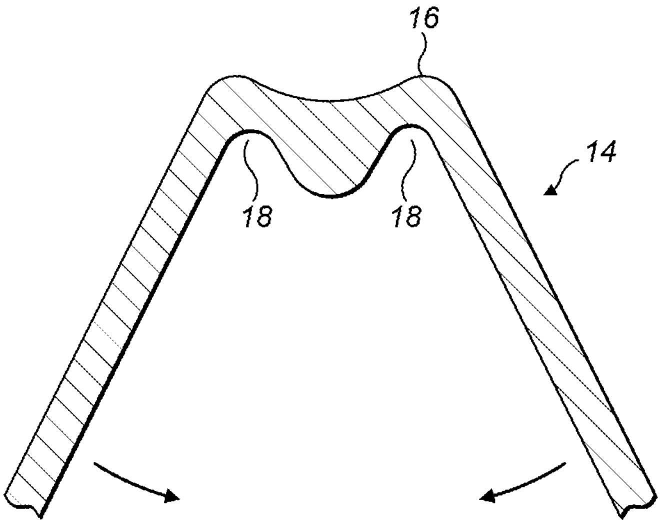
FIG. 2 - PRIOR ART

CREASING DEVICES

CROSS-REFERENCE TO RELATED PATENT APPLICATIONS

This patent application is continuation of International Application No. PCT/GB2015/052747, filed on Sep. 23, 2015, which claims priority to United Kingdom Application No. 1416770.4, filed on Sep. 23, 2014, the entire teachings and disclosure of which are incorporated herein by reference thereto.

FIELD OF THE INVENTION

This invention relates to creasing devices for creasing stock such as paper, card, film, foil or other sheet material to enable it to be easily folded. Such a device may be fitted to the output of a printing machine or the input of a folding machine or it can be used in a stand-alone creasing machine or in other contexts.

BACKGROUND OF THE INVENTION

A high percentage of printed stock such as book covers and brochures needs to be creased before the next operation of folding can be carried out. The substrate for the printing may be paper, card, film, foil or any other suitable sheet material.

A known device for creasing stock is described in international patent application WO 2007/023258 A and illustrated schematically in present FIG. 1. The device consists of a male drum 2 mounted on a first rotary shaft (not shown in FIG. 8), the male drum 2 having a circumferential groove 3 that carries a creasing ring 4. The profile of the creasing ring 4 comprises a projecting, circumferential creasing rib 6 flanked by a pair of generally flat shoulders 8. A female drum 10 is mounted on a second, parallel rotary shaft (not shown in FIG. 8) and has at least one circumferential channel 12 formed in its surface. The creasing ring 4 is made from a resilient material such as rubber. The drums 2,10 are normally made of metal.

When the creasing ring 4 projecting from the male drum 2 is aligned with the channel 12 of the female drum 10, a sheet of the stock 14 fed between the two counter-rotating drums 2,10 will be creased by the pressure of the creasing ring 4 deforming the stock 14 into the channel 12. The stock 14 is then easy to fold along the pre-formed crease. Normally a "reverse" fold is used, so that the side 16 of the stock against which the creasing rib 4 acted is on the outside of the fold as shown in FIG. 2, although in many cases the stock can also successfully be folded the opposite way.

In many digital printing processes, the ink is applied to the stock in such a way that it is not absorbed but dries to form a coating on the surface. Coated papers can be regarded as a three-layered composite material of a sandwich structure, comprising a paper sheet as the middle layer with porous outer layers of a highly mineral-filled later polymer on both sides. A typical thickness for a coated paper used in digital printing is 0.10 to 0.15 mm with the total thickness of the coating layers accounting for approximately 10% of the sheet thickness. When stock printed in this way is subsequently folded along a pre-formed crease, the coating has a tendency to crack and reveal the colour of the underlying stock, which can make the crease unsightly to the eye and rough to the touch. The problem is particularly acute when poor quality stock, for example recycled card and paper, and poor quality inks are employed. It is also a result of digital printing processes, which normally use heat to dry the ink, thereby removing moisture from the paper. In contrast, traditional litho printing adds moisture.

The use of a resilient creasing ring on the male drum as described in WO 2007/023258 A has largely solved the problem of cracking on the outside of the fold. However, two lines of cracking 18 can still occur on the inside of the fold at the positions shown in FIG. 2.

BRIEF SUMMARY OF THE INVENTION

Embodiments of the invention provide a creasing device as defined in the claims.

This creasing device differs from that known in the prior art in that the female drum has a pair of radially projecting lateral ribs immediately adjacent to the central channel. Preferably the central channel has side walls formed by the respective lateral ribs. The female drum according to the invention can be used with a conventional male drum like that shown in FIG. 1 such that the lateral ribs press the stock against the resilient shoulders of the male drum. It has been found that this arrangement reduces the problem of cracking of the printed coating on the inside of the fold. The lateral ribs on the female drum both define the width of the central crease and compress the stock on each side of the crease. Compression of the stock better defines the crease and where the printed coating has been compressed its subsequent cracking during folding is inhibited. Depending on the nature of the stock, the shape of the ribs and on how compliant the resilient shoulders of the male drum are compared with the ribs of the female drum, the compression of the sheet of stock may crush the stock to reduce its thickness and/or deform it to form lasting creases or scores in the sheet. If scores are formed in this way, they will project from the sheet in the opposite direction to the main crease and to a smaller distance than the main crease. In either case, it is preferable to avoid damaging the surface of the sheet, which could encourage cracking when a fold is subsequently formed.

The radially outer part of each lateral rib may have a rounded profile to concentrate the pressure in one area without sharp edges that might damage the surface of the stock. Alternatively, the radially outer part of each lateral rib may have a generally square profile with radiused corners. The radius on the corner adjacent to the central channel may be different from the radius on the corner remote from the central channel. For example the radius on the adjacent corner may be smaller in order to form a well-defined crease, while the radius on the remote corner may be larger in order to avoid producing a noticeable line on the stock running parallel to the crease.

Preferably the central channel of the female drum has a base with a flat profile so that, with a suitable correspondence between the depth of the central channel and the height of the creasing rib of the male drum, the creasing rib compresses the stock against the base of the channel and further reduces the risk of cracking at the centre of the fold. For this purpose it is preferred that the base of the channel should be formed from a relatively rigid material.

Preferably, the region of the outer surface adjacent to the lateral ribs is cylindrical, having a first radius, and the base of the central channel has a second radius that is smaller than the first radius. In this way the base of the central channel is not merely a part of the same outer surface that lies between the lateral ribs. Instead it lies below the outer surface (i.e. closer to the axis of rotation) in order to form a deeper channel and give better definition to the crease.

Optionally a further region of the outer surface that is not immediately adjacent to the lateral ribs is cylindrical, having a third radius that is larger than the first radius. In this embodiment the adjacent region of the outer surface is recessed relative to the further region of the outer surface. If the lateral ribs are formed of a resilient material, these adjacent recesses permit them greater freedom to deform laterally (i.e. in the direction along the axis) when the tips of the lateral ribs are compressed against the stock.

The material of the lateral ribs may be chosen to provide a sufficient degree of compression of the stock without the risk of damage to it. Given that the lateral ribs on the female side are acting (through the sheet) against the resilient shoulders of the creasing ring on the male side, there may be sufficient resiliency on the male side for the lateral ribs to be formed integrally with the remainder of the female drum and from the same rigid material, which is typically steel. However, forming the lateral ribs from a different material allows their material characteristics such as resilience, grip and durability to be chosen independently from those of the rest of the drum. If the ribs are not to be formed from the same material as the drum then they must be provided by one or more inserts. Provision must normally be made for replacement of the inserts when they have become worn and optionally also for exchanging the inserts to accommodate different types and thicknesses of stock or different styles of crease.

The pair of lateral ribs and the central channel may be formed by a single insert that is located in a single circumferential groove in the female drum. One suitable material for such an insert would be nylon, which provides good wear characteristics and can form a relatively rigid base of the central channel, while retaining a certain amount of resilience in the lateral ribs.

Alternatively, the pair of lateral ribs may be formed by a pair of inserts that are respectively located in a pair of circumferential grooves in the female drum. The base of the central channel is then formed by the rigid material of the drum itself between the grooves, which allows the lateral ribs to be formed from a less rigid material such as a resilient rubber. (The term "rubber" is used to include natural rubber that incorporates various additives, or that has been chemically or physically treated to change its properties, as well as artificial polymer materials having similar characteristics to rubber.)

Embodiments of the invention further provide a method of creasing stock by feeding it through such a creasing device.

Conventional methods may be used for mounting the male and female drums on their respective axles and for setting the spacing between them and those methods will not be described further.

It has been found that a crease formed in accordance with the present invention can be satisfactorily folded, without cracking, not only in the sense illustrated in FIG. 5 but also in the opposite sense. On setting up the creasing device, the user may therefore choose to invert it to give a different appearance in the finished product. In addition, a fold formed in this way will not have the bead 36 projecting on the inside of the fold, so it may be more suitable for folding a document cover that requires further sheets of paper to be inserted into it, adjacent to the fold.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a partial cross section showing the profiles of male and female drums of a creasing device known in the prior art;

FIG. 2 shows the manner in which creased stock is folded and illustrates the location of cracking in the prior art;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 3:
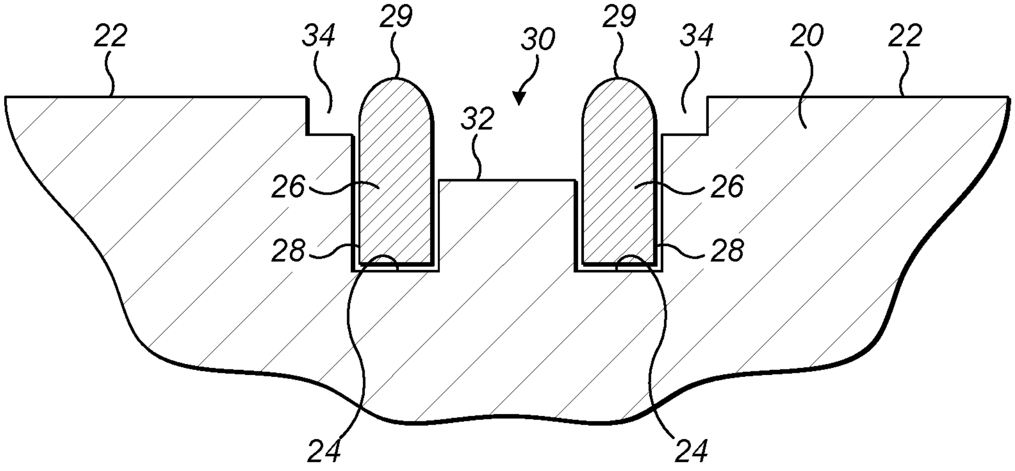
FIG. 3 is a partial cross section showing the profiles of a female drum according to a first embodiment of the invention.
Figure 4:
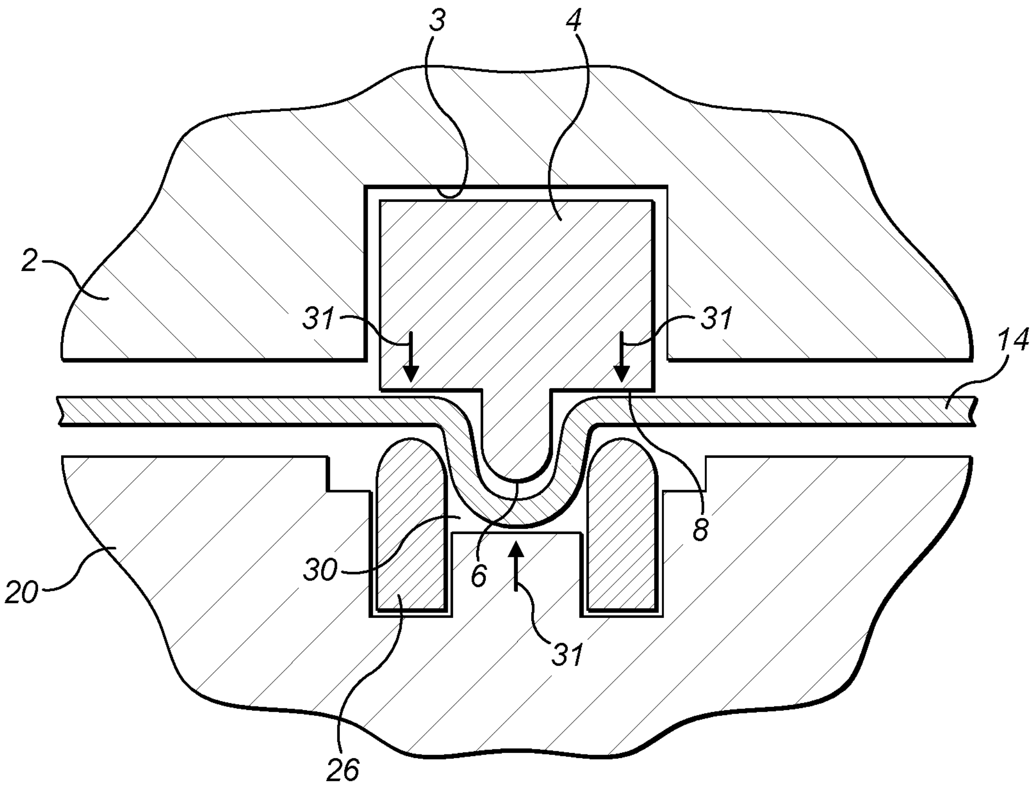
FIG. 4 is a partial cross section showing the profiles of male and female drums of a creasing device according to the first embodiment of the invention.

FIG. 3 shows a female drum 20 of a creasing device according to a first embodiment of the invention. FIG. 4 shows the creasing device comprising the female drum of FIG. 3 in use with a male drum 2 and creasing ring 4 that are the same as shown in FIG. 1. The female drum 20 comprises a cylindrical outer surface 22, in which are formed a pair of grooves 24 extending around the circumference of the drum 20. In each of the grooves 24 is mounted a rib 26 that projects from the mouth of the groove 24 beyond the radius of the cylindrical outer surface 22. The lateral ribs 26 define between them a circumferential central channel 30.

In use, the central channel 30 is aligned with the creasing rib 6 on the creasing ring 4 of the male drum 2. The spacing of the lateral ribs 26 of the female drum is such that they are respectively aligned with the shoulders 8 of the creasing ring 4 of the male drum 2. When the male and female drums 2,20 are counter-rotated and a sheet of the stock 14 is fed between them, the sheet therefore is pushed into the central channel 30 by the creasing rib 6 to form the centre of the crease. The lateral ribs 26 compress the stock 14 against the shoulders 8 of the creasing ring 4 to define the edges of the crease. Preferably the depth of the central channel 30 is such that the rim of the creasing rib 6 also compresses the stock 14 against the base 32 of the channel 30 at the centre of the crease. The compression points are indicated by arrows 31 in FIG. 4.

As illustrated, the profile of each of the lateral ribs 26 is square at the base 28 to rest in the base of the groove 24 and rounded at the rim 29 to be suitable for applying pressure to the sheet of stock 14 without damaging it. The lateral ribs 26 may be made of a material such as rubber that can deform resiliently when pressure is applied to them. The regions 34 of the outer surface 22 that are immediately adjacent to the lateral ribs 26 are formed with a reduced radius. This creates a circumferential recess 34 alongside each rib 26 that gives it more space to deform laterally if required (i.e. by bending or spreading in a direction parallel to the axis of the drum 20). It is not essential that these recesses 34 be rectangular in cross-section: either the wall or the base of the recess (or both) could be inclined relative to the axis.

The side walls of the central channel 30 are formed by the lateral ribs 26 themselves. The base 32 of the channel 30 is formed by a cylindrical surface of the female drum 20. Preferably, as shown, the base 32 of the channel has a smaller radius than the outer surface 22 of the drum so that the channel 30 is recessed relative to the outer surface 22. However, if the height of the lateral ribs 26 is great enough, the base 32 may be aligned with the outer surface 22 and still define a channel 30 of sufficient depth for creasing.

Figure 5:
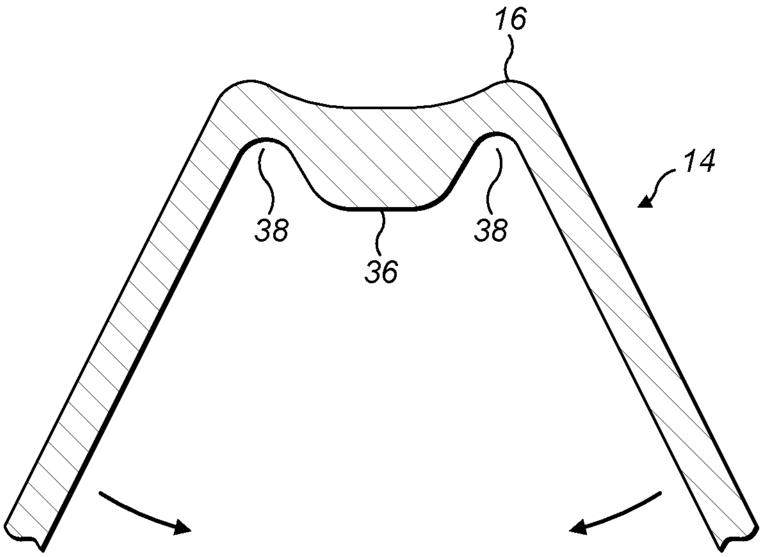
FIG. 5 shows the folding of stock that has been creased in accordance with the invention.

FIG. 5 corresponds to the prior art in FIG. 2 and illustrates the different form of fold created in stock 14 that has been creased in accordance with the present invention. The compression of the stock 14 between the creasing rib 6 and the base of the central channel 30 results in a broader, flatter crease in the central area 36. The edges 38 of the crease are more sharply defined than in the prior art as a result of the compression of the stock 14 between the lateral ribs 26 on the female side and the shoulders 8 of the creasing ring 4 on the male side. It has also been found that compressing the printed stock 14 in this area during the creasing process reduces or eliminates the tendency of the printed coating to crack during folding.

Figure 6:
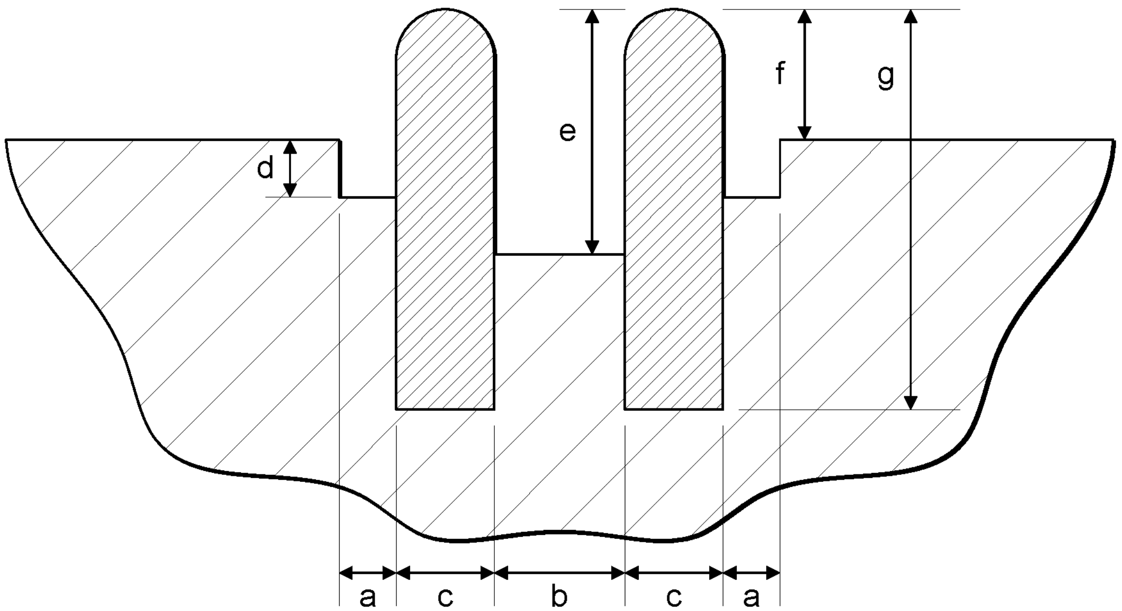
FIG. 6 is a partial cross section similar to FIG. 3, which labels the dimensions of the female drum.

A single female drum 20 may provide more than one such creasing arrangement comprising a central channel 30 with its associated pair of lateral ribs 26. For example, a set of a channel 30 with a pair of ribs 26 may be provided near each of the two axial ends of the female drum 20 (not illustrated). The respective channels 30 and/or pairs of ribs 26 may differ in their dimensions or materials in order to accommodate different types of stock or different widths of crease in a single creasing device. Further alternatives may be provided on further drums 20. FIG. 6 illustrates the profile of the female drum 20 of FIG. 3 with various dimensions labelled a to g. Some of these dimensions may be varied between the different sets of channels 30 and ribs 26. Table 1 below lists possible values for these dimensions for four sets of channels and ribs, provided on two female drums, which between them can accommodate a good range of thicknesses of card stock 14. The maximum outer diameter of the drum 20 in each case is 44.0 mm.

TABLE 1

| (mm) | a | b | c | d | e | f | g |
|---|---|---|---|---|---|---|---|
| Set A | 0.5 | 0.65 | 1.08 | 0.5 | 1.425 | 0.625 | 2.8 |
| Set B | 0.5 | 0.96 | 1.08 | 0.5 | 1.55 | 0.75 | 2.8 |
| Set C | 0.5 | 1.16 | 1.08 | 0.5 | 1.6 | 0.75 | 2.8 |
| Set D | 0.5 | 1.26 | 1.08 | 0.5 | 1.7 | 0.75 | 2.8 |

Figure 7:
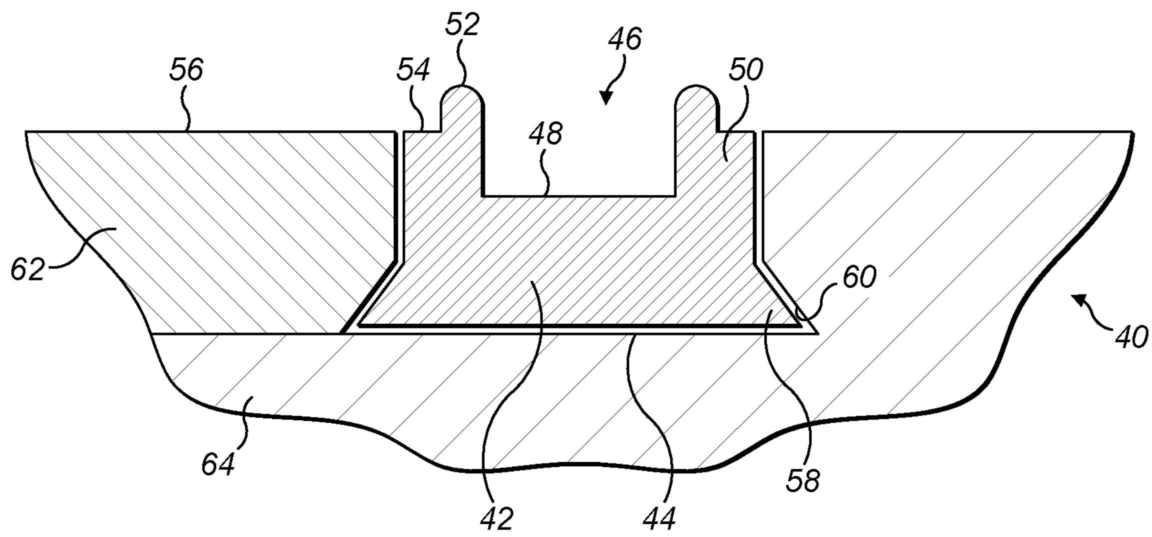
FIG. 7 is a partial cross section showing the profiles of a female drum according to a second embodiment of the invention.
Figure 8:
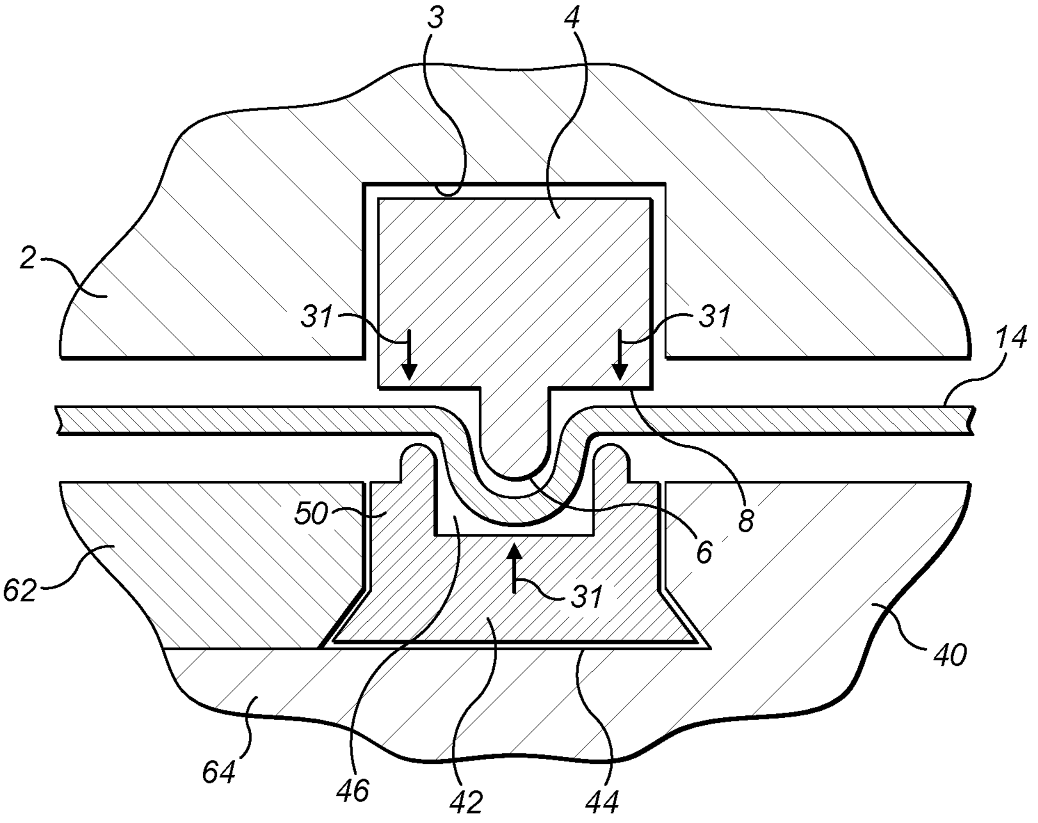
FIG. 8 is a partial cross section showing the profiles of male and female drums of a creasing device according to the second embodiment of the invention.

FIG. 7 shows a female drum 40 according to a second embodiment of the invention. FIG. 8 shows a creasing device comprising the female drum 40 of FIG. 7 in use with a male drum 2 and creasing ring 4 that are the same as shown in FIGS. 1 and 4. In this embodiment, the creasing parts of the female drum 40 are provided by a single insert 42 that is located in a single circumferential groove 44. The insert 42 has a generally U-shaped cross section to define a central channel 46 with a square profile at its base 48. The side walls of the channel 46 are formed by two projecting lateral ribs 50. In this example, the projecting rims 52 of the lateral ribs 50 have a much smaller radius than in the first embodiment. This would allow them to be formed much closer together (i.e. with a narrower central channel 46) than illustrated, in order to create a narrower crease suitable for a thinner stock such as paper. In this example, the U-shaped insert 42 further comprises shoulders 54, which define the portion of the outer surface of the drum 40 immediately adjacent to the lateral ribs 50. In alternative embodiments of the invention, the tips of the lateral ribs may formed with such a small radius that they would not naturally be described as rounded. They may form nibs or blades, provided that they are not sharp and rigid enough to cut the paper or damage its surface.

In this embodiment the base 48 of the central channel 46 and the two lateral ribs 50 are all formed from the same material so a compromise must be found between the relative rigidity that is desirable for the channel base 48 and the relative flexibility that is desirable for the lateral ribs 50. Nylon is one suitable material that can meet both these requirements, is hard-wearing and reasonably gentle on the stock 14 to be creased. The form of the lateral ribs 50 could be altered to increase their flexibility if desired. Because the lateral ribs 50 of this embodiment are not intended to deform laterally, the adjacent recesses 34 shown in FIG. 3 are not provided here; the adjacent region of the outer surface provided by the shoulders 54 has the same radius as the further region 56 of the outer surface of the drum 40. However, the use of such recesses in combination with a single insert is not excluded from the scope of the invention.

Various different methods of anchoring the creasing ring 4 in the groove 3 of the male drum 2 have been disclosed in the prior art. If the creasing ring 4 is made from a sufficiently elastic material, it can be formed as a continuous ring that is stretched over the drum 2 and allowed to relax into the groove 3, where it is held in place by its own tension. Alternatively, the creasing ring 4 may be split at one circumferential location to for two abutting ends. This permits the ring 4 to be removed completely from the drum 2 and replaced without dismounting the drum 2 from the axle (not shown) of the creasing device but then the ring 4 can no longer be held in the groove 3 under its own tension. Arrangements have been disclosed in the prior art for anchoring the two abutting ends of the ring 4 at the location of the split, or for anchoring axial projections from the ring 4 within recesses in the side walls of the groove 4. As a final alternative, it may be possible to make the split ring from a material that is sufficiently flexible that the split can be prised open to allow the ring to pass around the drum but sufficiently stiff that the split will then snap closed and the ring 4 will remain in position in the groove 3.

Any of these alternatives may also be employed for mounting the inserts 26,42 in the grooves 24,44 of the female drum 20,40. The method of using a continuous ring may be most appropriate for the pair of discrete lateral ribs 26 formed from rubber as shown in FIG. 3, while a stiff split ring may be most appropriate for the single insert 42 formed of nylon that is shown in FIG. 7. FIG. 8 shows how the single insert 42 in the form of a split ring may be anchored in the groove 44 by providing the insert 42 with axial projections 58 that engage in recesses 60 formed in the side walls of the groove 44 to prevent the insert 42 being withdrawn radially from the groove 44. In this case, the body of the female drum is formed in two parts that meet at the groove 44, namely a collar 62 that is mounted by a screw thread (not shown) on a hub 64. When it is desired to replace the insert 42, the collar 62 can be unscrewed to displace it a short distance axially relative to the hub 64, thereby widening the groove 44 enough for the insert 42 to be removed.

It is also possible to form the insert of the female drum from steel or another suitable metal or other rigid material. The creasing ring 4 on the male side of the sheet 14 may be sufficiently flexible to prevent damage to the stock from the rigid lateral ribs. In this case, even if split, the insert would have no flexibility to allow it to be fitted over the axle from one side. It must either be in the form of a continuous ring that is fitted by sliding from the end of the axle while the axle is demounted, or the insert could be provided in two semi-circular parts that fit together around the axle and are then clamped between the other drum parts.

The resilient shoulders 8 of the male drum 2 are conveniently formed as part of the profile of the resilient creasing ring 4, as shown in the illustrated embodiments. However, the shoulders could alternatively be provided as separate components, formed either as resilient inserts in shallow channels on the male drum that flank the central rib 6, or as resilient strips mounted on the surface of the male drum. The shoulders 8 are illustrated as flat (i.e. with their outer surface parallel to the axis) but that is not essential. In some applications it might be advantageous to provide them with a pre-formed groove to receive the lateral ribs 26,50 of the female drum 20,40; or to provide a groove in the male drum 2 behind the shoulders 8 to allow them to deform into the groove under pressure from the lateral ribs 26,50.

It will be understood that the embodiments of the invention described here are illustrative only and not limiting. In particular, features shown here in separate embodiments may be used together in various combinations.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A creasing device comprising:

a female drum that comprises:

an outer surface;

a central channel that extends around the circumference of the drum; and a pair of lateral ribs that extend around the circumference of the drum adjacent to and on each side of the central channel, the lateral ribs projecting radially outwards relative to a region of the outer surface adjacent to the lateral ribs; and a male drum that comprises:

a resilient creasing ring, wherein a profile of the creasing ring comprises a single central rib; and a pair of resilient shoulders flanking the single central rib;

wherein the male and female drums are arranged with their axes parallel, wherein the single central rib of the creasing ring extends into the central channel of the female drum to crease a sheet of stock therebetween; and wherein the lateral ribs of the female drum engage with the resilient shoulders of the male drum to compress the sheet of stock therebetween, wherein the resilient shoulders of the male drum are integral with the resilient creasing ring.

2. A creasing device according to claim 1, wherein the radially outer part of each lateral rib has a rounded profile.

3. A creasing device according to claim 1, wherein the central channel has side walls formed by the respective lateral ribs.

4. A creasing device according to claim 1, wherein the central channel has a base with a flat profile.

5. A creasing device according to claim 4, wherein the region of the outer surface of the female drum has a first radius, and wherein the base of the central channel has a second radius that is smaller than the first radius.

6. A creasing device according to claim 5, wherein a further region of the outer surface that is not immediately adjacent to the lateral ribs is cylindrical, having a third radius that is larger than the first radius.

7. A creasing device according to claim 1, wherein the pair of lateral ribs and the central channel are formed by a single insert that is located in a single circumferential groove in the female drum.

8. A creasing device according to claim 7, wherein the insert also comprises the adjacent region of the outer surface of the female drum.

9. A creasing device according to claim 7, wherein the insert further comprises at least one axial projection for anchoring the insert in a recess in a side wall of the circumferential groove.

10. A creasing device according to claim 7, wherein the insert is made from nylon.

11. A creasing device according to claim 1, wherein the pair of lateral ribs are formed by a pair of inserts that are respectively located in a pair of circumferential grooves in the female drum.

12. A creasing device according to claim 11, wherein the inserts are made from rubber.

13. A creasing device according to claim 12, wherein the single central rib of the creasing ring of the male drum engages with the base of the central channel of the female drum to compress the sheet of stock therebetween.

14. A method of creasing stock in a creasing device according to claim 1, comprising:

counter-rotating the male and female drums;

feeding the stock between the drums;

creasing the stock between the single central rib of the creasing ring of the male drum and the central channel of the female drum; and compressing the stock between the lateral ribs of the female drum and the resilient shoulders of the male drum.

15. A method of creasing stock according to claim 14, further comprising compressing the stock between the single central rib of the creasing ring of the male drum and the base of the central channel of the female drum.

* * * * *